US010655606B2

(12) United States Patent
Caponetti et al.

(10) Patent No.: US 10,655,606 B2
(45) Date of Patent: May 19, 2020

(54) BLADE LOAD SENSING SYSTEM FOR A WIND TURBINE

(71) Applicant: VESTAS WIND SYSTEMS A/S, Aarhus N (DK)

(72) Inventors: Fabio Caponetti, Aarhus C (DK); Dan Hilton, Gjern (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 69 days.

(21) Appl. No.: 15/579,097

(22) PCT Filed: Jun. 17, 2016

(86) PCT No.: PCT/DK2016/050196
§ 371 (c)(1),
(2) Date: Dec. 1, 2017

(87) PCT Pub. No.: WO2016/206692
PCT Pub. Date: Dec. 29, 2016

(65) Prior Publication Data
US 2018/0171983 A1 Jun. 21, 2018

(30) Foreign Application Priority Data
Jun. 24, 2015 (DK) .......................... PA 2015 70388

(51) Int. Cl.
*F03D 17/00* (2016.01)
*G10K 13/00* (2006.01)
(Continued)

(52) U.S. Cl.
CPC ............. *F03D 17/00* (2016.05); *G01K 13/00* (2013.01); *G01K 13/08* (2013.01); *G01L 5/0061* (2013.01);
(Continued)

(58) Field of Classification Search
CPC ........ F03D 17/00; G01K 13/00; G01K 13/08; G01L 5/0061
See application file for complete search history.

(56) References Cited

U.S. PATENT DOCUMENTS

2004/0108732 A1 6/2004 Weitkamp
2008/0279499 A1 11/2008 Mortensen et al.
(Continued)

FOREIGN PATENT DOCUMENTS

CN 1461882 A 12/2003
CN 101023266 A 8/2007
(Continued)

OTHER PUBLICATIONS

Danish Patent and Trademark Office Search Report for Application No. PA 2015 70388 dated Jan. 25, 2016.
(Continued)

*Primary Examiner* — Daniel S Larkin
*Assistant Examiner* — Anthony W Megna Fuentes
(74) *Attorney, Agent, or Firm* — Patterson + Sheridan, LLP (57) ABSTRACT

A sensor system for a wind turbine, comprising: a blade load sensor; a blade temperature sensor configured to provide a temperature measurement of an associated blade; a load calculation module configured to output a temperature-corrected blade load value; and a processing unit interfaced with the temperature sensor. The processing unit includes a temperature estimator configured to determine an estimated temperature of the wind turbine blade based on at least one wind turbine parameter; and a comparator configured to generate a fault signal based on a comparison between the blade temperature measurement and the estimated blade temperature. The invention also resides in a corresponding method.

16 Claims, 4 Drawing Sheets

(51) Int. Cl.
  *G01L 5/00* (2006.01)
  *G01K 13/08* (2006.01)
  *G01K 13/00* (2006.01)

(52) U.S. Cl.
  CPC ....... *F05B 2200/12* (2013.01); *F05B 2260/80* (2013.01); *F05B 2260/821* (2013.01); *F05B 2260/84* (2013.01); *F05B 2270/303* (2013.01); *F05B 2270/325* (2013.01); *F05B 2270/331* (2013.01); *F05B 2270/808* (2013.01)

(56) References Cited

U.S. PATENT DOCUMENTS

| | | | |
|---|---|---|---|
| 2010/0232963 A1 | 9/2010 | Volanthen et al. | |
| 2011/0135474 A1 | 6/2011 | Thulke et al. | |
| 2013/0280070 A1 | 10/2013 | Lindby et al. | |
| 2014/0161152 A1* | 6/2014 | Kuhn | H02H 6/005 374/152 |

FOREIGN PATENT DOCUMENTS

| | | |
|---|---|---|
| CN | 103718406 A | 4/2014 |
| EP | 1359321 A1 | 11/2003 |
| KR | 20130032597 A | 4/2013 |
| WO | 2016206692 A1 | 12/2016 |

OTHER PUBLICATIONS

TW Verbruggen et al., "Fibre Optic Blade Monitoring for optimisation of offshore wind farm O&M," Oct. 2010, www.ecn.nl, 46 pages.
International Search Report for Application No. PCT/DK2016/050196 dated Sep. 7, 2016.
SIPO of the People's Republic of China Notification of First Office Action for Application No. 201680036883.9 dated Dec. 5, 2018.
SIPO of the People's Republic of China Notification of Second Office Action for Application No. 201680036883.9 dated Jul. 10, 2019.

* cited by examiner

BLADE LOAD SENSING SYSTEM FOR A WIND TURBINE

TECHNICAL FIELD

The invention relates to a system and a method for determining the load on a wind turbine blade.

BACKGROUND

The blades of a wind turbine experience loads during operation due to aerodynamic, gravitational and inertial forces. Excessive loads can damage the blades and also other components of the wind turbine, such as the generator drive train, for example, and so it is important to ensure that the loads experienced by the blades remain within acceptable limits. In order to monitor this, modern wind turbines are usually provided with a blade load sensor system. Such a system typically includes a load sensor provided in each blade to measure the load experienced by that blade. The load sensors are usually provided in the form of a strain gauge and more particularly as an optical strain gauge, for example similar to the one described in EP1230531.

All strain gauges are fundamentally sensitive to temperature due to thermal expansion of the measured object (i.e. the blade) being detected as strain by the gauge, or due to direct temperature effects on the sensor package itself. To accommodate this, blade load sensor packages are known that include a temperature sensor so that the load signal can be compensated for temperature effects using data from the temperature sensor.

However, if the temperature sensors malfunction, the accuracy of the measured load values will be adversely affected. It is therefore desirable to provide a blade load sensor system that provides reliable load measurements even if the temperature sensors are malfunctioning.

SUMMARY OF INVENTION

Against this background the invention provides, in a first aspect, a sensor system for a wind turbine, comprising: a blade load sensor; a blade temperature sensor configured to provide a temperature measurement of an associated blade; a load calculation module configured to output a temperature-corrected blade load value; and a processing unit interfaced with the temperature sensor. The processing unit includes a temperature estimator configured to determine an estimated temperature of the wind turbine blade based on at least one wind turbine parameter; and a comparator configured to generate a fault signal based on a comparison between the blade temperature measurement and the estimated blade temperature.

The invention also extends to, and therefore embraces, a method for evaluating a sensor system for a wind turbine, comprising determining a temperature measurement of a wind turbine blade; determining an estimated temperature of the wind turbine blade based on at least one wind turbine parameter; determining a temperature-corrected load measurement of a wind turbine blade; and, generating a fault signal based on a comparison between the blade temperature measurement and the estimated blade temperature.

Beneficially, embodiments of the invention provide the ability to determine whether the temperature measurement of a sensor system, particularly in a blade load sensor system in a wind turbine, may be indicating an inaccurate reading. This can lead to a diagnosis that a temperature sensor may be faulty, in which case a maintenance procedure can be scheduled, but can also mean that steps can be taken to substitute in a temperature value that has a higher confidence factor. Such an 'estimated temperature' may be a simple model-based approach in which the estimated temperature is taken to be the same as another wind turbine parameter, such as one or more of: the ambient air temperature; the temperature within another component or region of the wind turbine remote from the temperature sensor; the temperature reading from another temperature sensor within the same blade or indeed another blade; or also a temperature reading from another wind turbine.

In other embodiments, a more sophisticated modelling approach is adopted in which the temperature estimator performs a modelling of the temperature of the blade in the vicinity of the temperature sensor based on the net heat energy transferred to the interior of the blade.

The comparator may be configured to generate a fault signal in circumstances where the difference between the blade temperature measurement and the estimated blade temperature exceeds a predetermined threshold. In other embodiments, the comparator may be configured to generate a fault signal based on the output of a statistical technique to evaluate the difference between the blade temperature measurement and the estimated blade temperature.

In one embodiment, the system includes a plurality of blade temperature sensors, each of which is configured to provide a respective blade temperature measurement. In such a case, the comparator may be configured to compare each blade temperature measurement to a respective estimated blade temperature, and wherein a respective fault signal generated by the comparator is based upon these comparisons. In this way, the comparator is able to isolate one of the blade temperature sensors as faulty by performing a comparison of blade temperature measurements.

In addition to isolating a fault down to a specific sensor, or to the temperature estimator itself, the processing unit may be configured to determine a corrected temperature measurement in respect of at least one temperature sensor in circumstances where a fault signal is generated, which may be based on the associated estimated temperature determined by the temperature estimator. Accordingly, a load value may be calculated based on this corrected temperature measurement.

In other aspect, the invention can also be expressed as a computer program product downloadable from a communication network and/or stored on a machine readable medium, comprising program code instructions for implementing the method as discussed above, and also as a machine readable medium having stored thereon such a computer program product.

BRIEF DESCRIPTION OF THE DRAWINGS

One or more embodiments of the invention will now be described, by way of example only, with reference to the accompanying drawings, in which.

DETAILED DESCRIPTION

Figure 1:
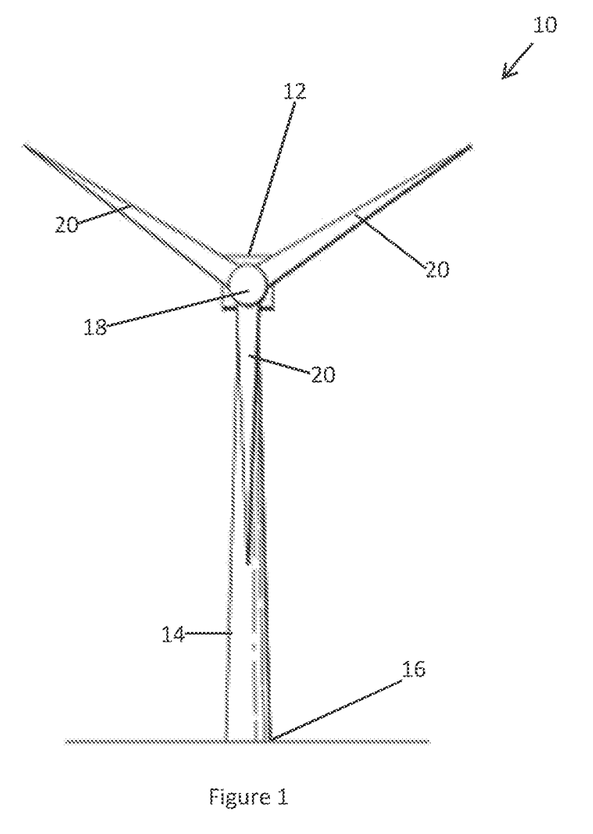
FIG. 1 is a front view of a wind turbine.

Referring to FIG. 1, a wind turbine 10 is shown comprising a nacelle 12 mounted on top of a tower 14 which is itself fixed into a foundation 16 in the usual manner. The nacelle 12 houses various power generating components of the wind turbine 10 and supports a rotor comprising a hub 18 and three blades 20. The wind turbine installation shown in FIG. 1 is a horizontal axis wind turbine (HAVVT) installation which is a common type of system, although other types exist to which the invention is also applicable. As is known, the flow of wind acting on the blades 20 spins the rotor which drives the power generation equipment housed in the nacelle 12.

As discussed above, during operation of the wind turbine 10, the blades 20 experience loads due to aerodynamic, gravitational and inertial forces. In order to monitor these loads, the wind turbine 10 is provided with a blade load sensor system in accordance with an embodiment of the invention, features of which will now be described with reference to FIG. 2.

It should be noted at this stage that the accompanying figures are schematic and have been simplified for the purposes of clarity and to avoid unnecessary detail obscuring the principle form of the invention. In practice, of course, the wind turbine 10 would include many more components. The skilled person will appreciate that additional conventional components would be present in a practical implementation of a wind turbine, and so their presence is implied.

Figure 2:
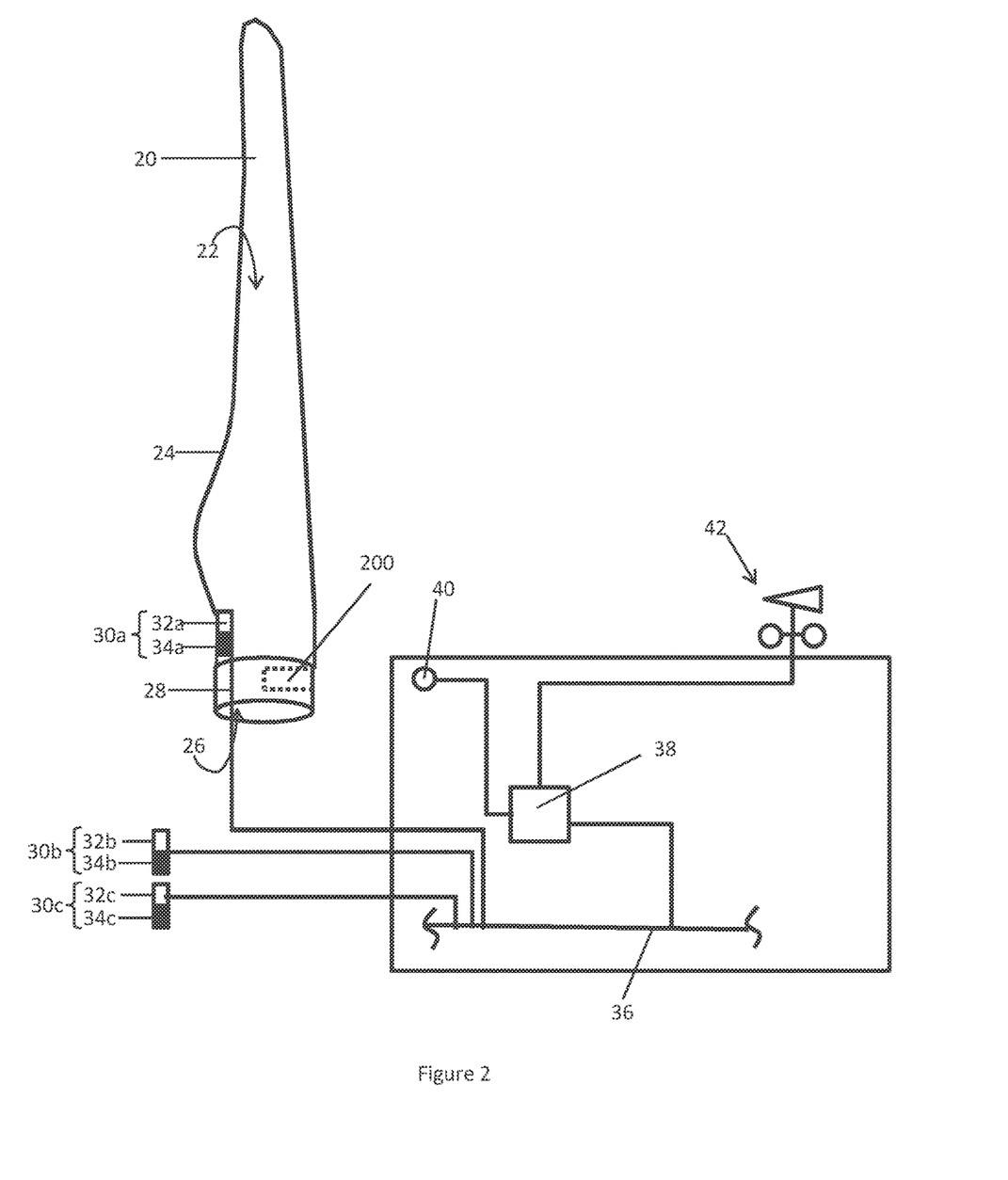
FIG. 2 is a blade load sensor system in accordance with an embodiment of the invention.

In FIG. 2, the blade 20 is shown as having an aerofoil profile 22 provided by an outer shell 24 defining a substantially hollow interior 26. The aerofoil profile 22 of the blade 20 blends into a substantially cylindrical section at its root end 28 where the blade 20 is coupled to the hub 18.

The blade 20 includes a load sensor package 30a located near to the root end 28 of the blade 20. The load sensor package 30a comprises a load sensor 32a and a temperature sensor 34a. The temperature sensor 34a is configured to measure the temperature of the blade 20 in the vicinity of the load sensor 32a to allow the load sensor output signal to be compensated for temperature effects using data from the temperature sensor 34a. The load sensor package 30a may be bonded to the interior surface of the blade 20 or alternatively, the sensor package 30a may be embedded within the structure of the shell 24 or bonded to the exterior surface. Although in the illustrated embodiment the load sensor 32a and the temperature sensor 34a are an integrated package, it is also envisaged that the load and temperature sensors could be physically separated from one another.

The load sensor package 30a is connected to a data bus 36 so that any subsystem connected to that data bus 36 may pick off the output signals of the load sensor package 30a. One such subsystem is a processing unit 38. The role of the processing unit 38 is to pick off the temperature measurement signal provided by the temperature sensor 34a of the load sensor package 30a from the data bus 36 and to output a verified or corrected temperature signal or, indeed, load signal. In doing so, the processing unit 38 is operable to perform diagnostics on the sensor packages in order to identify one or more faulty temperature sensors, and to take action to ensure that the resulting temperature sensor and/or load sensor signals are accurate, as will be explained. The processing unit 38 outputs the verified or corrected temperature signal and load signal to the data bus 36 so that it is available to any connected subsystem of the wind turbine 10. The processing unit 38 may alternatively be configured to output the verified or corrected temperature signal and load signal directly to any relevant subsystem.

At this point is should be mentioned that only a single blade 20 is shown in FIG. 2, but that in practice the processing unit 38 will receive data input from other load sensor packages mounted on the other blades 20. In FIG. 2, therefore, further load sensor packages are labelled 30b and 30c without their respective blades, and are also connected to the data bus 36. The further load sensor packages 30b,30c of course include associated load sensors 32b,32c and temperature sensors 34b,34c. Hereinafter, references to a load sensor package, and to its respective temperature sensor and load sensor, in general will be made using the reference numeral 30, whereas references to specific ones of the three load sensor packages will use the specific references 30a, 30b and 30c.

At this point it should be mentioned that in FIG. 2 a single processing unit 38 is common to all the load sensor packages 30, but, alternatively, a dedicated processing unit could be provided for each of the packages 30. Also, although only a single load sensor package 30 is shown with respect to each blade 20, it should be appreciated more than one load sensor package 30 may be built into each blade, depending on the application.

As has been mentioned above, the processing unit 38 is interfaced with the load sensor package 30 so as to receive the raw temperature measurement signal from the temperature sensor 34 and is configured to perform a verification or correction function so that the temperature signal that is output from the processing unit 38 is credible. In doing so, the processing unit 38 is arranged to monitor (i.e. receive data signals related to) one or more wind turbine parameters. The one or more wind turbine parameters may include, but are not restricted to: the nacelle temperature and the ambient temperature. For this purpose, the wind turbine 10 is provided with various sensors which provide data signals to the processing unit 38. The skilled person will appreciate that the sensors may provide signals to the processing unit 38 via a wired or wireless connection, as appropriate.

As can be seen in FIG. 2, the nacelle 12 includes an interior temperature sensor 40 to measure the temperature inside the nacelle 12. The interior temperature sensor 40 may be part of a nacelle temperature control system which maintains the temperature inside the nacelle 12 within acceptable operational limits to prevent the power generation equipment inside the nacelle 12 from overheating.

The nacelle 12 also includes an ambient temperature sensor 42 to measure the ambient air temperature in the vicinity of the wind turbine 10. In FIG. 2, the ambient temperature sensor 42 is shown as part of a meteorological system (or 'met mast') mounted to the nacelle, but the ambient temperature sensor 42 may be provided as simply a temperature sensing package mounted on any suitable component of the wind turbine 10 or provided remotely from the wind turbine 10. Alternatively, it is envisaged that the processing unit 38 may receive information relating to the ambient air temperature from an external meteorological information source that may be accessed, for example, via a conventional wireless connection.

Having described the general arrangement of the components of the blade load sensor system, further details of an embodiment of the invention will now be described with reference to FIG. 3.

As has been mentioned, the role of the processing unit 38 is to output blade load signals onto the data bus 36 which are acceptably accurate to be used for various applications run by the other subsystems of the wind turbine. For example, applications may be run that function to reduce blade loading, and therefore rely on blade load signals that are an accurate reflection of the actual load on the blade. Since the temperature of the load sensor packages 30 can affect the output load signals, the processing unit 38 is operable to compensate the load sensor signals to account for the prevailing temperature as measured by the associated temperature sensor. However, it is possible that the temperature sensor will fail, or may drift, such that the load sensor signal is not compensated for correctly which will mean that downstream functions that rely on accurate load sensor signals will also be adversely affected. In this embodiment, therefore, the processing unit 38 is provided with functionality that monitors the output of the temperature sensors of the load sensor packages and acts to diagnose if any of those sensors are outputting faulty signals. Various actions can be taken if a temperature sensor is recognised as being faulty. For example, the load sensor readings associated with the faulty temperature sensor can be disregarded or, alternatively, a substitute temperature value can be used in the pace of the temperature measurement from the faulty sensor.

Figure 3:
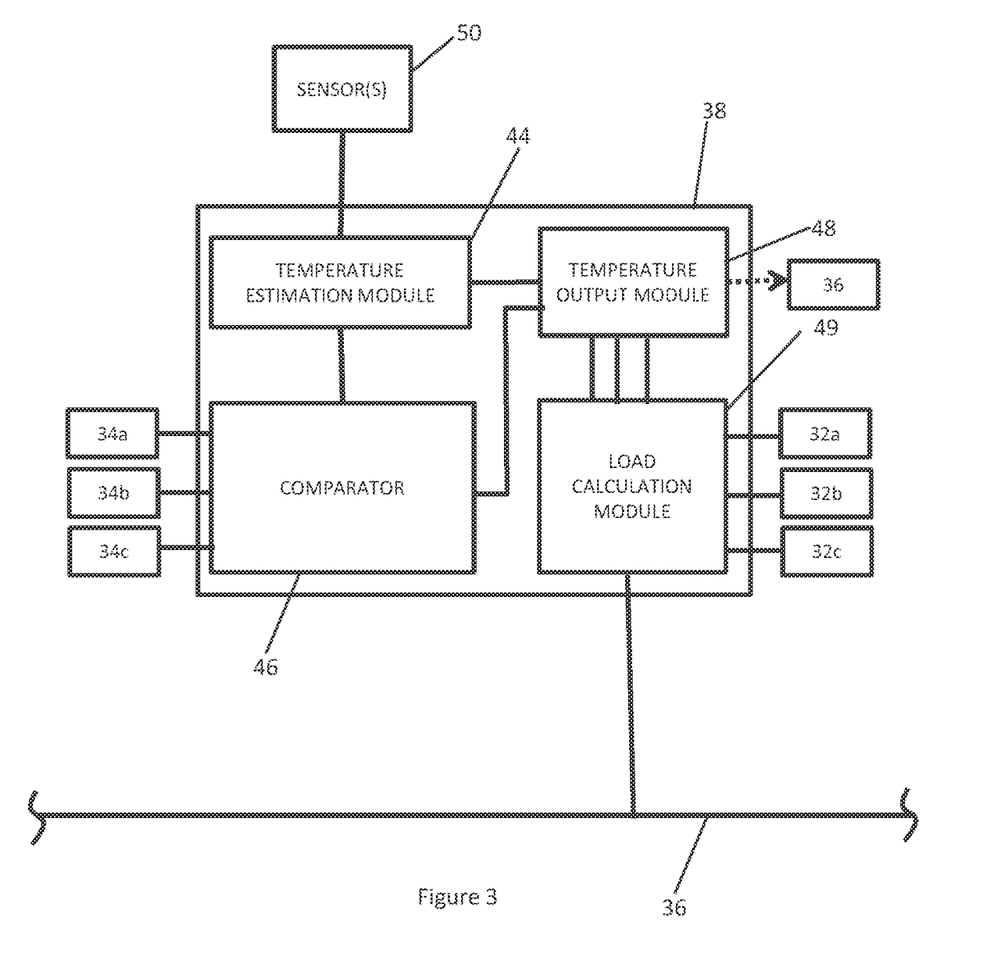
FIG. 3 is a block diagram showing features of the system in more detail.

In overview, the processing unit 38 comprises a temperature estimator or 'temperature estimation module' 44, a comparator 46, a temperature output module 48, and a load calculation module 49, as are represented as functional blocks in FIG. 3. Although not illustrated specifically in FIG. 3, it should be appreciated that the processing unit 38 also includes a memory area on which suitable software is stored and an execution environment to run the control software. It should be noted at this stage that the functional blocks illustrate a specific functionality of the processing unit 38 and, as such, they may be implemented on hardware, software or firmware, either within the same processing environment or on a distributed processing architecture. That is to say, the functional architecture illustrated in FIG. 3 is not intended to limit the invention to a specific hardware or software architecture, platform or processing environment. The system architecture discussed here is used merely as an example to illustrate the technical functionality of the invention and the invention may be implemented by a system having a different specific architecture.

The load calculation module 49 is responsible for a determining a value for blade load for each of the blades of the wind turbine based on measurements from the respective blade load sensors 32*a-c* and respective temperature values that it receives from the temperature output module 48. However, notably, the temperature values that are received from the temperature output module 48 are validated in that they are ensured that they are an acceptably accurate indication of the actual temperature within the respective blade. Together, the temperature estimation module 44, the comparator 46 and the temperature output module 48 provide this functionality, as will now be explained.

The temperature estimation module 44 is shown in FIG. 3 as receiving data input signals from one or more sensors 50. As illustrated in FIG. 2, these data input signals may correspond to the ambient temperature and the nacelle temperature.

The role of the temperature estimation module 44 is to output an estimated temperature of each blade 20 (in the vicinity of the load sensor package 30) based on the input signals. In order to output an estimated blade temperature, the temperature estimation module 44 implements a blade temperature model. In doing so, the temperature estimation module 44 makes the assumption that the temperature of each blade is the same. Therefore, the following description refers to a single estimated blade temperature.

The comparator 46 receives data input signals from the temperature estimation module 44, i.e. the estimated blade temperature, and also the measured blade temperatures from the temperature sensors 34*a-c*. Note that for clarity purposes the temperature data is shown in FIG. 3 as direct input from the sensors 34*a-c*, but the same data could also be input to the comparator 46 from the data bus 36. The role of the comparator 46 is to identify whether any of the blade temperature signals from the sensors 34*a-c* are invalid and, if so, to generate a fault signal based at least in part on a comparison of the three measured blade temperature signals and the estimated blade temperature. As will be described in further detail, the fault signal indicates when there is a fault in respect of one or more of the temperature sensors 34.

Based on the indication of the fault signal, the role of the temperature output module 48 is to provide a verified or corrected temperature signal for each blade 20. The verified or corrected blade temperature signals are determined based on the measurements of the blade temperature sensors 34 and/or the estimated blade temperature, as will be explained in more detail. Thus, the blade load sensor system described above allows credible blade temperature signals and, moreover, blade load signals, to be generated for each blade 20 of the wind turbine 10.

The functionality performed by the blade load sensor system shown in FIG. 3 will now be described in more detail with reference to FIG. 4.

Figure 4:
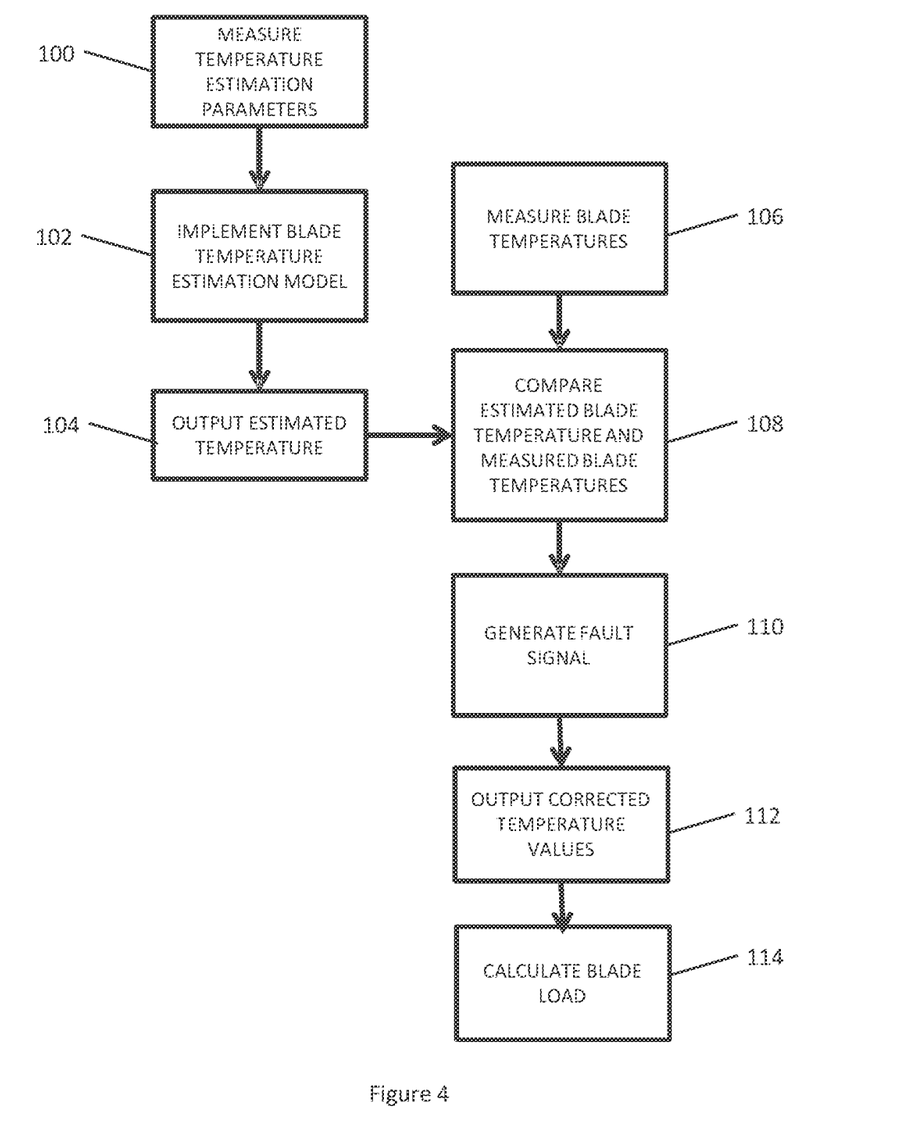
FIG. 4 is a flow chart illustrating steps of a method that may be performed by the system of FIG. 3.

As shown in FIG. 4, at step 100 wind turbine parameters such as the ambient temperature and the nacelle temperature are measured by the relevant sensors 50. At step 102, the temperature estimator 44 receives the relevant sensor outputs and implements a blade temperature model, as mentioned above. The temperature estimator 44 then outputs an estimated blade temperature at step 104.

Meanwhile, at step 106, the temperatures of the blades 20 are measured by the temperature sensors 34 mounted on the blades 20.

At step 108, the comparator 46 receives signals from the temperature estimator 44 and the blade temperature sensors 34 and compares each blade temperature measurement to the estimated blade temperature. At step 110, the comparator generates a fault signal based on these comparisons.

According to different embodiments of the invention, the comparator 46 may be configured to perform various processes in order to perform this comparison. Some examples of comparison processes that may be performed will now be described.

In a simple realisation of the comparator 46, three bilateral comparisons are performed based on the estimated blade temperature: one for each measured blade temperature. Based on these comparisons, the comparator determines that a temperature sensor 34 has a fault if the difference between the temperature measured by that sensor 34 and the estimated blade temperature exceeds a predetermined threshold value. The comparator then generates a fault signal accordingly, indicating the binary fault status of each temperature sensor 34.

The comparison process described above is relatively simple and advantageously minimises the processing burden on the comparator 46. It is envisaged, however, in other embodiments that a more sophisticated analysis of the blade temperature sensor outputs may be performed. Specifically, the following example allows the comparator 46 to detect the presence of a faulty temperature sensor, and isolate which sensor is faulty, taking account of the possibility that the temperature estimator may be faulty, as will be explained.

In this example, the comparator 46 performs six bilateral comparisons: one between each blade temperature measurement and the estimated blade temperature, as in the example above; and one between each pair of blade temperature measurements. Each of these comparisons results in a difference signal indicating the difference in value between the two compared temperature signals. The comparator 46 analyses these signals to generate an appropriate fault signal. So, if one of the temperature sensors is faulty, its temperature reading will differ appreciable from the readings of the other temperature sensors, but will also differ appreciable from the estimated temperature from the temperature estimation module 44. Alternatively, if the temperature estimation module 44 has developed a fault, the temperature measurements from the temperature sensors will be close in value, but will be expected to differ appreciably from the estimated temperature.

The difference signals may be analysed by comparison with a predetermined threshold, similar to the process described above in relation to the previous example. Alternatively, an appropriate statistical method may be employed to increase the sensitivity of the system without prompting an increase in erroneous indications of faulty sensors. In this example, the difference signals are analysed in accordance with the principle of the up/down counter or 'leaky bucket' model although other methods such as cumulative sum (CUSUM) or the generalised likelihood ratio test (GLRT) are equally applicable. Such statistical techniques are generally known in the art, so a detailed explanation is not necessary.

According to the up/down counter method, each difference signal is communicated to a counter which can change state in either the up or down direction under the control of an up or down selector input. When the value of the difference signal is above a predetermined threshold, the selector input is considered to be in the up state and the counter increments its value. Conversely, when the value of the difference signal is below a predetermined threshold, the selector input is considered to be in the down state and the counter decrements its value. Typically, the counter also has a maximum and minimum value at which up state and down state selector inputs respectively have no effect. Thus, the value of the up/down counter increases or decreases depending on the difference signal input. When the value of the up/down counter exceeds a predetermined threshold, the counter generates an alarm signal that indicates that the comparison associated with that counter has resulted in a significant difference.

The appropriate values of the various predetermined thresholds are determined based on the characteristics of the sensors and of the required sensitivity of the fault detection. These values may be stored in the memory area of the processing unit to be accessed by the comparator 46 in order to implement the up/down counter analysis.

The comparator 46 then generates a fault signal based on the outputs of all of the up/down counters. If the counters associated with all three comparisons involving a certain blade temperature sensor are each generating an alarm signal, then the comparator 46 will determine that that sensor is faulty and will generate a fault signal accordingly. Similarly, if the counters associated with all three comparisons involving the estimated blade temperature are generating an alarm signal, then the comparator will determine that the temperature estimator is faulty. Thus, the comparator is able to detect and isolate a faulty temperature sensor and generate a fault signal accordingly.

Returning to FIG. 4, at step 112, the temperature output module 48 outputs verified or corrected temperature signals for each blade 20 based on the fault signal generated by the comparator 46 and the measured and estimated blade temperatures. In addition, it is envisaged that the corrected temperature values may be output to the data bus 36 where they can be used by other subsystems of the wind turbine, if appropriate. If the fault signal indicates that a particular sensor 34 is working correctly, then the temperature output module 48 simply outputs a temperature signal for the corresponding blade 20 that is the same as the temperature measured by the temperature sensor 34. Thus, the output of the sensors 34 are verified. These credible temperature signals are output to the load calculation module 49 where they are be used to determine temperature-corrected values for the loads experienced by the blades 20.

If the fault signal indicates that a particular sensor 34 is faulty, then the temperature output module 48 provides a corrected temperature signal for the corresponding blade 20. In an embodiment of the invention, the corrected temperature signal is the estimated blade temperature. In other embodiments, the corrected temperature may be the average value of the working blade temperature sensors.

Whichever output is provided, the load calculation module 49 can be considered to receive a correct or verified value of temperature in order to calculate a temperature-compensated load signal for each blade 20 of the wind turbine. In FIG. 4, the load calculation module 49 calculates the respective load values at step 114. The process in which the load calculation module 49 calculates the temperature-compensated load signal based on the raw load signal from the load sensor 32 and the temperature signal from the temperature output module 48 is a technique that would be well known to the skilled person, for example based on sensor characteristic curves, and so it will not be described in detail here.

In the above embodiments, the determination of whether one of the blade temperature sensors is faulty is based at least in part on the output of the temperature estimation module 44. In determining an estimated blade temperature, the temperature estimation module 44 may implement various forms of temperature model depending on the accuracy of the temperature estimation that is required. Some examples will now be described by way of illustration.

According to one embodiment of the invention, the temperature estimation module 44 relates the estimated temperature directly to the ambient temperature by assuming that the blade temperature is equal to the ambient temperature in the vicinity of the wind turbine 10. Thus, there is only one data input signal to the temperature estimation module 44, namely ambient temperature data from the ambient temperature sensor 42, such that the output of the temperature estimation module 44 is the same as the input. In such an embodiment, it is not necessary for the blade load sensor system to include a nacelle temperature sensor 40. Thus, a simple and relatively inexpensive blade load sensor system can be provided.

In other embodiments, it is envisaged that other wind turbine parameters, that is to say, temperature measurements, could be used as the estimated blade temperature. For example, the temperature measurement from one of the other temperature sensors from within the same blade could be used as the estimated temperature, or, indeed, the temperature measurement from a sensor mounted in one of the other blades of the wind turbine, based on the understanding that the blade temperatures should be about the same, given the common ambient environment. Still further, the temperature measurement of another wind turbine could be used for the estimated temperature.

Tests have shown that this relatively simple blade temperature model gives good results in practice and the resulting estimated blade temperature closely matches the actual temperature of the blades 20. However, for circumstances where the accuracy of the blade temperature sensors 34 is more crucial, it is envisaged that the temperature estimation module 44 would implement a more sophisticated blade temperature model to give a more accurate estimate of the temperature of the blades 20. One such model is described below by way of example. Since the estimated blade temperature is assumed to be the same for each blade 20 of the wind turbine 10, the following description will refer to one blade 20; it should, however, be appreciated that the description equally applies to the other blades 20.

The model described here estimates the temperature in the hollow interior 26 of the blade 20. This gives a good estimate of the temperature of the blade 20 in the vicinity of the load sensor package 30 for embodiments where the load sensor package 30 is bonded to the interior surface of the blade 20. However, this model is also applicable to embodiments where the load sensor package 30 is provided elsewhere in the blade 20 since the cavity 26 and shell 24 of the blade 20 are in good thermal contact and so share a similar temperature.

In this embodiment, the blade temperature model is constructed based on the net heat transferred to the blade cavity 26. If the net heat transfer can be determined, the temperature of the blade 20 can be calculated according to the specific heat relation:

$$Q_{net} = cm(T_b - T_i)$$

where: $Q_{net}$ is the net heat transferred to the blade cavity 26; c is the heat capacity of air at standard temperature and pressure; m is the mass of the air within the blade cavity 26; $T_b$ is the temperature of the blade cavity 26 and $T_i$ is the initial temperature of the blade cavity 26.

In order to determine the heat transferred to the blade cavity 26, it is necessary to consider how heat is transferred to and from the blade 20. In this model, it is assumed that the blade 20 is in thermal contact with the ambient surroundings and the nacelle 12 only. Generally, heat is transferred from the nacelle 12 to the blade 20, through apertures in the blade bulkhead near to the root 28 of the blade 20, and from the blade 20 to the surroundings via the material of the blade shell 24.

Newton's law of cooling allows the quantity of heat transferred to or from the blade 20 to be quantified. Newton's law of cooling states that:

$$\frac{dQ}{dt} = h \cdot A \cdot (T_1 - T_2)$$

where: Q is the heat transferred from a first body to a second body; h is the heat transfer coefficient; A is the heat transfer surface area and $T_1$ and $T_2$ are the temperatures of the first and second bodies respectively.

Using this relation, and integrating over time, the amount of heat transferred to the blade cavity 26 is given by:

$$Q_{net} = Q_{nacelle \rightarrow blade} - Q_{blade \rightarrow environment}$$
$$= \int h_n A_n (T_n - T_b) dt - \int h_b A_b (T_b - T_a) dt$$

where: $h_n$ and $h_b$ are the heat transfer coefficients between the nacelle 12 and the blade 20, and the blade 20 and the surroundings respectively; $A_n$ is the combined area of the apertures at the root end 28 of the blade 20 leading to the hub 18; $A_b$ is the surface area of the airfoil profile 22 of the blade 20 and $T_n$, $T_b$ and $T_a$ are the nacelle, blade and ambient temperatures respectively.

Combining the above equation with the specific heat relation and including time evolution factors, the skilled person will appreciate that the temperature of the blade cavity 26 is given by:

$$T_b = T_i + \frac{1}{cm}[-(T_n - T_b)e^{-h_n A_n t} + (T_b - T_a)e^{-h_b A_b t}]$$

Thus, a blade temperature model is provided that relates the temperature of the blade 20 in the vicinity of the load sensor package 30 to the ambient temperature (as measured by the ambient temperature sensor 42) and the nacelle temperature (as measured by the nacelle temperature sensor 40).

The temperature estimation module 44 may implement the above model by performing one or more algorithms to calculate a value for the estimated blade temperature. The values of the relevant constants may be stored in the memory area of the processing unit 38. Alternatively, the estimated blade temperature may be calculated for a range of ambient and nacelle temperatures ahead of time and stored in the memory area of the processing unit 38 as a data set that correlates values of the ambient and nacelle temperature to values of the estimated blade temperature, i.e. a look-up table. The temperature estimation module 44 can then consult this look-up table to determine the estimated blade temperature based on the measured ambient and nacelle temperatures at that moment in time.

It will be appreciated that in other embodiments, the temperature estimation module may implement other blade temperature models. These models may include the effects of any other factors affecting the temperature of the blade 20 as is appropriate for the configuration of the wind turbine 10 and the required accuracy of the temperature estimation. For example, a blade sensor system according to an embodiment of the invention may be installed in a blade including an anti-icing system, as indicated by the dashed box in FIG. 2, and indicated with the reference 200. The anti-icing system 200 prevents ice from forming on the surfaces of the blade shell 24 by circulating hot air around the blade cavity 26 when required. It is envisaged that the temperature module will implement a blade temperature model that accounts for the effect of the heat transferred to the blade cavity 26 by the anti-icing system 200. To this end, the anti-icing system 200 may include a status indicator that provides a signal to the processing unit 38 indicating the heat transferred to the blade cavity 26 by the anti-icing system 200.

It is also envisaged that in other embodiments of the invention, the blade temperature model will be constructed empirically in full or in part. The necessary experimental data could be acquired from a working wind turbine in situ or from controlled experiments conducted in a laboratory or workshop.

The invention claimed is:

1. A sensor system for a wind turbine, comprising: a blade load sensor; a blade temperature sensor configured to provide a blade temperature measurement at a first location of an associated blade; a load calculation module configured to output a temperature-corrected blade load value; and a processing unit interfaced with the blade temperature sensor and including: a temperature estimator configured to determine an estimated blade temperature of the blade based on a temperature at a second location, wherein the second location is different from the first location; and a comparator configured to generate a fault signal based on a comparison between the blade temperature measurement and the estimated blade temperature, wherein the processing unit is configured to determine a corrected temperature measurement in respect of at least one blade temperature sensor in circumstances where the fault signal is generated.

2. The system of claim 1, wherein the temperature estimator is configured to determine the estimated blade temperature based on at least one wind turbine parameter, wherein the estimated blade temperature is an estimate of a temperature in the vicinity of the blade temperature sensor.

3. The system of claim 2, wherein the temperature estimator is configured to determine the estimated blade temperature in the vicinity of the blade temperature sensor based on a temperature measurement of a component or region of the wind turbine remote from the blade temperature sensor.

4. The system of claim 3, wherein the temperature estimator is configured to determine the estimated blade temperature in the vicinity of the blade temperature sensor based on the temperature of the ambient environment.

5. The system of claim 1, wherein the comparator is configured to generate the fault signal in circumstances where a difference between the blade temperature measurement and the estimated blade temperature exceeds a predetermined threshold.

6. The system of claim 1, wherein the comparator is configured to generate the fault signal based on the output of a statistical technique to evaluate a difference between the blade temperature measurement and the estimated blade temperature.

7. The system of claim 1, wherein the blade temperature sensor forms part of a blade load sensor package.

8. The system of claim 1, wherein the blade temperature sensor is incorporated into a root end of the associated blade.

9. The system of claim 1, including a plurality of blade temperature sensors, each of which is configured to provide a respective blade temperature measurement.

10. The system of claim 9, wherein the comparator is configured to compare each blade temperature measurement to a respective estimated blade temperature, and wherein a respective fault signal generated by the comparator is based upon these comparisons.

11. The system of claim 9, wherein the comparator is configured to isolate one of the blade temperature sensors as faulty by performing a comparison of blade temperature measurements.

12. The system of claim 1, wherein the processing unit is configured to determine a corrected temperature measurement based on the estimated blade temperature determined by the temperature estimator.

13. The system of claim 1, including a plurality of blade temperature sensors, each of which is configured to provide a respective blade temperature measurement; wherein the comparator is configured to compare each blade temperature measurement to a respective estimated blade temperature, and wherein a respective fault signal generated by the comparator is based upon the comparisons; wherein the corrected temperature measurement is based on the blade temperature measurements of at least one of the other blade temperature sensors.

14. The system of claim 1, including a plurality of blade temperature sensors, each of which is configured to provide a respective blade temperature measurement; wherein the comparator is configured to isolate one of the blade temperature sensors as faulty by performing a comparison of blade temperature measurements; wherein the corrected temperature measurement is based on the blade temperature measurements of at least one of the other blade temperature sensors.

15. A method for evaluating a sensor system for a wind turbine, the method comprising: determining a blade temperature measurement using a blade temperature sensor at a first location of a wind turbine blade; determining an estimated blade temperature of the wind turbine blade based on a temperature at a second location, wherein the second location is different from the first location, wherein the estimated blade temperature is further determined based on at least one wind turbine parameter, wherein the estimated blade temperature is an estimate of a temperature in the vicinity of the blade temperature sensor, and wherein the estimated blade temperature in the vicinity of the blade temperature sensor is modelled based on a net heat energy transferred to an interior of the blade; determining a temperature-corrected blade load value of the wind turbine blade; and generating a fault signal based on a comparison between the blade temperature measurement and the estimated blade temperature.

16. A computer program product comprising a non-transitory computer-readable storage medium having computer-readable program code embodied therewith, the computer-readable program code configured to perform an operation comprising: determining a blade temperature measurement at a first location of a wind turbine blade; determining an estimated blade temperature of the wind turbine blade based on a temperature at a second location, wherein the second location is different from the first location; determining a temperature-corrected blade load value of a wind turbine blade based upon a corrected temperature measurement in the event of a fault signal being generated; and generating the fault signal based on a comparison between the blade temperature measurement and the estimated blade temperature.

* * * * *